(12) United States Patent
Nakamura et al.

(10) Patent No.: US 9,419,882 B2
(45) Date of Patent: Aug. 16, 2016

(54) NETWORK ANALYZING SYSTEM, AS WELL AS NETWORK ANALYZING APPARATUS AND NETWORK ANALYZING PROGRAM, AS WELL AS DATA PROCESSING MODULE AND DATA PROCESSING PROGRAM

(75) Inventors: Nobuyuki Nakamura, Tokyo (JP); Satoshi Ikada, Tokyo (JP); Masayuki Muratani, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 186 days.

(21) Appl. No.: 14/235,041

(22) PCT Filed: Apr. 27, 2012

(86) PCT No.: PCT/JP2012/061346
§ 371 (c)(1),
(2), (4) Date: Apr. 14, 2014

(87) PCT Pub. No.: WO2013/014988
PCT Pub. Date: Jan. 31, 2013

(65) Prior Publication Data
US 2014/0301222 A1    Oct. 9, 2014

(30) Foreign Application Priority Data

Jul. 27, 2011  (JP) ................................. 2011-164674

(51) Int. Cl.
*H04L 12/26*   (2006.01)
*H04L 12/24*   (2006.01)

(52) U.S. Cl.
CPC .......... *H04L 43/0894* (2013.01); *H04L 43/026* (2013.01); *H04L 43/04* (2013.01); *H04L 41/0213* (2013.01); *H04L 41/069* (2013.01);

(Continued)

(58) Field of Classification Search
None
See application file for complete search history.

(56) References Cited

U.S. PATENT DOCUMENTS

2003/0023785 A1    1/2003  Funato et al.
2007/0047468 A1 *  3/2007  Sumiyoshi .......... H04L 41/0803
                                                            370/254

(Continued)

FOREIGN PATENT DOCUMENTS

JP    H08-65301 A    3/1996
JP    2000-069002  *  3/2000 .............. H04L 12/24

(Continued)

OTHER PUBLICATIONS

Japanese Office Action with translation dated Jul. 7, 2015.

*Primary Examiner* — Ian N Moore
*Assistant Examiner* — Lakeram Jangbahadur
(74) *Attorney, Agent, or Firm* — Rabin & Berdo, P.C.

(57) ABSTRACT

The present invention relates to a network analyzing system that performs analyzing for a network. The network analyzing system includes one or a plurality of data processing modules and a network analysis apparatus, the network analysis apparatus includes a unit for accommodating the data processing modules, a unit for holding data-to-be-analyzed, a unit for storing data processing definition information that defines steps that carry out the processing of the data-to-be-analyzed using the data processing modules, a unit for causing the data processing modules to carry out data processing based on the data processing definition information to obtain a data processing result, and each data processing module includes a unit connecting to the network analysis apparatus, and a unit for carrying out data processing in accordance with a request.

5 Claims, 15 Drawing Sheets

(52) U.S. Cl.
CPC ................. *H04L 41/16* (2013.01); *H04L 41/20* (2013.01); *H04L 43/16* (2013.01)

(56) References Cited

U.S. PATENT DOCUMENTS

| | | |
|---|---|---|
| 2009/0183037 A1 | 7/2009 | Hamaguchi et al. |
| 2010/0195520 A1 | 8/2010 | Nakamura |
| 2011/0087863 A1 | 4/2011 | Watanabe et al. |
| 2012/0317276 A1* | 12/2012 | Muniraju ................ H04L 41/14 709/224 |

FOREIGN PATENT DOCUMENTS

| | | | | |
|---|---|---|---|---|
| JP | 2000-069002 A | | 3/2000 | |
| JP | 2003-046552 A | | 2/2003 | |
| JP | 2006-148686 A | | 6/2006 | |
| JP | 2007-067833 A | | 3/2007 | |
| JP | 2009-171252 A | | 7/2009 | |
| JP | 2010-183220 A | | 8/2010 | |
| JP | 2010-204974 A | | 9/2010 | |
| JP | 2011-081643 | * | 4/2011 | .............. G06F 15/80 |
| JP | 2011-081643 A | | 4/2011 | |

* cited by examiner

FIG. 2A

PROCESSING RULE R1

S101 { input1 = trafficdata;

S102 { 
Analyze1 = Engine1(input1, output_type1, parameter1);  } S102-1
Analyze2 = Engine2(analyze1, output_type2, parameter2);  } S102-2
Analyze3 = Engine3(analyze2, output_type3, parameter3);  } S102-3

S103 { Return analyze3;

FIG. 2B

PROCESSING RULE R2

```
S201 { input1 = flow_record;

S202 {  Analyze1 = Engine4(input1, output_type1, parameter1);   } S202-1
        Analyze2 = Engine5(input1, output_type1, parameter2);   } S202-2
        Analyze3 = Engine6(input1, output_type1, parameter3);   } S202-3

S203 {  If( (analyze1+analyze2+analyze3)>2) return 1;
        Else return 0;
```

FIG. 3

111  PROCESSING RULE MANAGEMENT TABLE

| RULE ID | USED ENGINES | | | | | | INTERVAL | INPUT DATA FORMAT |
| --- | --- | --- | --- | --- | --- | --- | --- | --- |
| | 1 | 2 | 3 | 4 | 5 | 6 | | |
| 1 | 1 | 1 | 1 | 0 | 0 | 0 | 10000 PACKETS | trafficdata |
| 2 | 0 | 0 | 0 | 1 | 1 | 1 | 10 SECONDS | flow_record |

FIG. 4

112 ENGINE MANAGEMENT TABLE

| ENGINE ID | IF NUMBER | ENGINE NAME | PROCESSING SUMMARY |
|---|---|---|---|
| 1 | 1 | engine1 | RTCP PACKET EXTRACTION PROCESSING |
| 2 | 2 | engine2 | DETECTION PROCESSING FOR FREQUENTLY OCCURRING ADDRESS COMBINATIONS |
| 3 | 3 | engine3 | ABNORMALITY DETERMINATION FOR EACH ADDRESS COMBINATION |
| 4 | 4 | engine4 | ABNORMALITY DETERMINATION USING DEGREE OF CHANGE IN TREND |
| 5 | 5 | engine5 | ABNORMALITY DETERMINATION USING RF PERIPHERY |
| 6 | 6 | engine6 | ABNORMALITY DETERMINATION USING LEARNING BY NEURO |

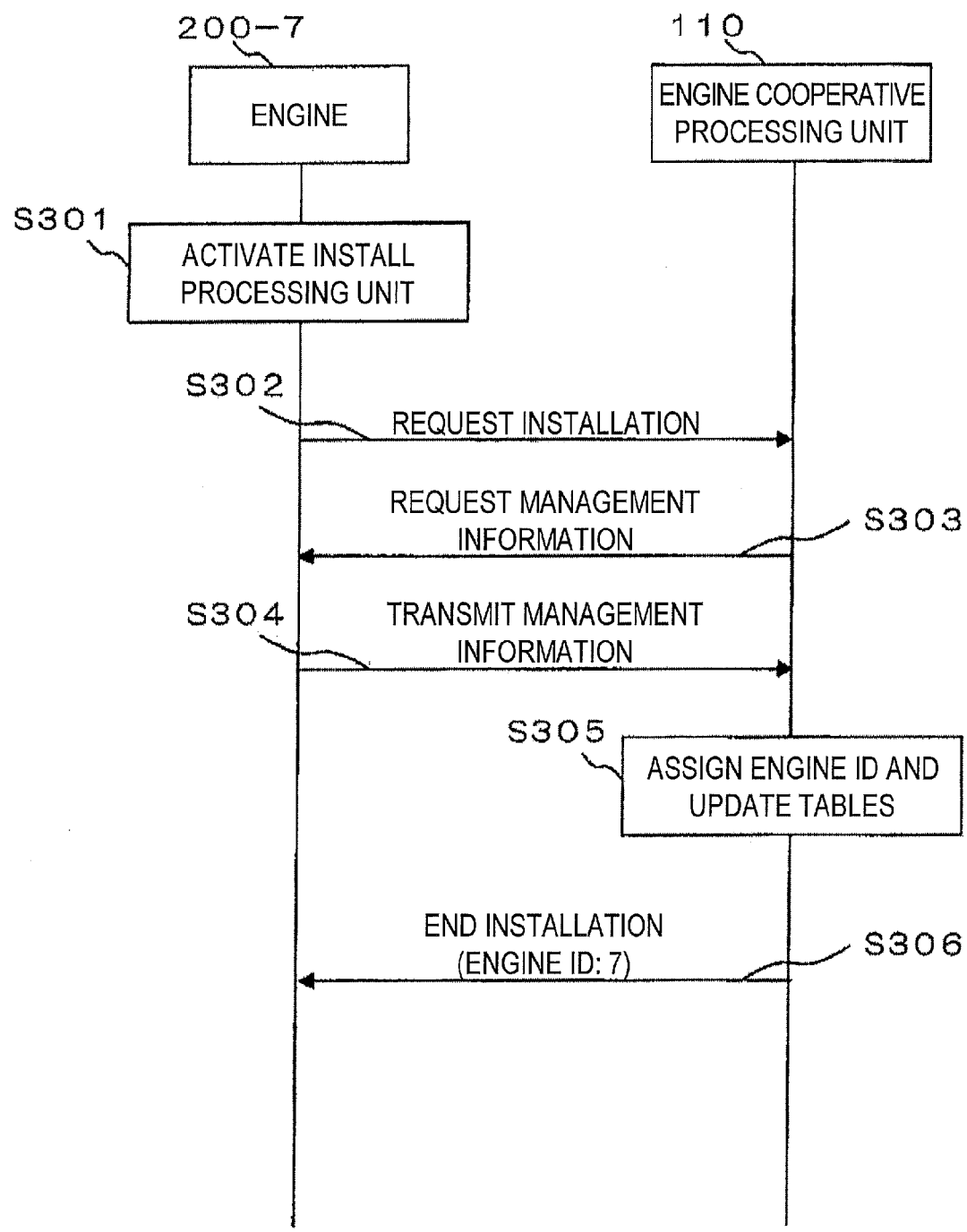

FIG. 7A

111 PROCESSING RULE MANAGEMENT TABLE

| RULE ID | USED ENGINES ||||||| INTERVAL | INPUT DATA FORMAT |
|---|---|---|---|---|---|---|---|---|---|
| | 1 | 2 | 3 | 4 | 5 | 6 | 7 | | |
| 1 | 1 | 1 | 1 | 0 | 0 | 0 | 0 | 10000 PACKETS | trafficdata |
| 2 | 0 | 0 | 0 | 1 | 1 | 1 | 0 | 10 SECONDS | flow_record |

FIG. 7B

112 ENGINE MANAGEMENT TABLE

| ENGINE ID | IF NUMBER | ENGINE NAME | PROCESSING SUMMARY |
|---|---|---|---|
| 1 | 1 | engine1 | RTCP PACKET EXTRACTION PROCESSING |
| 2 | 2 | engine2 | DETECTION PROCESSING FOR FREQUENTLY OCCURRING ADDRESS COMBINATIONS |
| 3 | 3 | engine3 | ABNORMALITY DETERMINATION FOR EACH ADDRESS COMBINATION |
| 4 | 4 | engine4 | ABNORMALITY DETERMINATION USING DEGREE OF CHANGE IN TREND |
| 5 | 5 | engine5 | ABNORMALITY DETERMINATION USING RF PERIPHERY |
| 6 | 6 | engine6 | ABNORMALITY DETERMINATION USING LEARNING BY NEURO |
| 7 | 7 | engine7 | USER-DEFINED PROCESSING |

| PROCESSING DESIGNATION HEADER PORTION<br>1 (output_type1, parameter1) ,<br>2 (output_type2, parameter2) ,<br>3 (output_type3, parameter3) ; | DATA PORTION<br>(input1) |
|---|---|

| PROCESSING DESIGNATION HEADER PORTION<br>2 (output_type2, parameter2) ,<br>3 (output_type3, parameter3) ; | DATA PORTION<br>(Analyze1) |
|---|---|

| PROCESSING DESIGNATION HEADER PORTION<br>3 (output_type3, parameter3) ; | DATA PORTION<br>(Analyze2) |
|---|---|

| PROCESSING DESIGNATION HEADER PORTION<br>; | DATA PORTION<br>(Analyze3) |
|---|---|

| PROCESSING DESIGNATION HEADER PORTION | DATA PORTION |
|---|---|
| 1 (output_type1, parameter1) ; | (input1) |

| PROCESSING DESIGNATION HEADER PORTION | DATA PORTION |
|---|---|
| 2 (output_type2, parameter2) ; | (input1) |

| PROCESSING DESIGNATION HEADER PORTION | DATA PORTION |
|---|---|
| 3 (output_type3, parameter3) ; | (input1) |

| PROCESSING DESIGNATION HEADER PORTION | DATA PORTION |
|---|---|
| ; | (Analyze1) |

| PROCESSING DESIGNATION HEADER PORTION | DATA PORTION |
|---|---|
| ; | (Analyze2) |

| PROCESSING DESIGNATION HEADER PORTION | DATA PORTION |
|---|---|
| ; | (Analyze3) |

NETWORK ANALYZING SYSTEM, AS WELL AS NETWORK ANALYZING APPARATUS AND NETWORK ANALYZING PROGRAM, AS WELL AS DATA PROCESSING MODULE AND DATA PROCESSING PROGRAM

TECHNICAL FIELD

The present invention relates to a network analyzing system, as well as a network analyzing apparatus and a network analyzing program, and additionally to a data processing module and a data processing program, and as one example can be applied to a system that carries out analysis relating to the usage situation and/or operational state of a network and monitors the network based on such analysis result.

BACKGROUND ART

It is known from the past that it is necessary to analyze the usage situation and/or operational state of a network and to monitor for abnormalities based on such analysis result.

In the past, a variety of algorithms for analyzing the usage situation and/or operational state of an IP network have been developed. More specifically, there are the technologies disclosed in Patent Literature 1 to 4 listed below, for example.

The algorithm disclosed in Patent Literature 1 calculates the appearance frequency of respective values in a data series (i.e., totals the number of errors detected for each IP address) for IP packets flowing on an IP network, and also totals the numbers of errors detected for each IP address and obtains IP addresses or routes that are the cause of a certain proportion of errors or higher.

The algorithm disclosed in Patent Literature 2 calculates statistics by carrying out statistical analysis on IP packets flowing on an IP network and detects abnormalities from a degree of deviation of such statistics in comparison with historical statistics.

In addition, the algorithm disclosed in Patent Literature 3 detects deterioration in the quality of a network via determinations made using an RF method (Random Forest method) on IP packets flowing on an IP network. The technology disclosed in Patent Literature 3 carries out learning in advance for a plurality of parameters by inputting normal state values as correct values (a teacher input) for determinations and detects quality deterioration from the parameters relating to the present IP network based on the results of such learning.

In addition, the algorithm disclosed in Patent Literature 4 carries out multi-resolution analysis on time series information (for example, transitions in the amount of traffic on an IP network), also carries out learning by inputting such resolution components into a learning apparatus that uses a neural network (neuro), and predicts time series information based on the results of such learning.

CITATION LIST

Patent Literature

Patent Literature 1: JP 2009-171252A
Patent Literature 2: JP 2006-148686A
Patent Literature 3: JP 2010-183220A
Patent Literature 4: JP 2010-204974A

SUMMARY OF INVENTION

Technical Problem

However, in the past, there has been the following problem when an ISP (Internet Service Provider) business or the like constructs a network analysis system that carries out analysis relating to the usage situation and/or operational state of its own network equipment using the existing technologies described above (for example, the technologies disclosed in Patent Literature 1 to Patent Literature 4).

As shown in Patent Literature 1 to 4, since complex processing is necessary for the processing algorithms used in a network analysis system and it is also necessary to carry out a large amount of processing in a short time (in particular, when monitoring a wide area network in real time), it has been necessary in the past to develop a system that is dedicated to the content to be analyzed.

For this reason, with an existing network analysis system, it has been difficult to flexibly change the specification at a later date (as examples, to change the procedure of the processing algorithm or to add processing steps) or to construct a system with a different specification by reusing the resources of a system that has already been constructed.

In view of the problem described above, there is demand for a network analysis system, as well as a network analysis apparatus and a network analysis program, and also a data processing module and a data processing program where it is easy to change the configuration of analysis processing relating to the usage situation and/or the operational state of a network.

Solution to Problem

The first present invention is characterized in that a network analysis system that carries out analysis related to a network, comprising, (1) one or a plurality of data processing modules; and a network analysis apparatus that accommodates the data processing modules and carries out an analysis process relating to the network using the data processing modules, (2) wherein the network analysis apparatus includes, (2-1) a data processing module accommodating unit accommodating the data processing modules, (2-2) a data-to-be-analyzed holding unit holding data-to-be-analyzed relating to the network, (2-3) a data processing definition information storing unit storing data processing definition information that defines steps that carry out the processing of the data-to-be-analyzed held in the data-to-be-analyzed holding unit using the one or a plurality of data processing modules, and (2-4) a data processing executing unit causing the data processing modules to carry out data processing based on the data processing definition information stored in the data processing definition information storing unit to obtain a data processing result, (3) and each data processing module includes, (3-1) a connection unit connecting to the network analysis apparatus, and (3-2) a data processing unit carrying out data processing in accordance with a request from the network analysis apparatus.

The second present invention is characterized in that a network analysis apparatus that accommodates one or a plurality of data processing modules and carries out an analysis process relating to a network using the data processing modules, comprising, (1) a data processing module accommodating unit accommodating the data processing modules, (2) a data-to-be-analyzed holding unit holding data-to-be-analyzed relating to the network, (3) a data processing definition information storing unit storing data processing definition information that defines steps that carry out the processing of the data-to-be-analyzed held in the data-to-be-analyzed holding unit using the one or a plurality of data processing modules, and (4) a data processing executing unit causing the data processing modules to carry out data processing based on the data processing definition information stored in the data processing definition information storing unit to obtain a data processing result.

The third present invention is characterized in that a network analysis program causing (1) a computer, which is installed in a network analysis apparatus that accommodates one or a plurality of data processing modules and carries out an analysis process relating to a network using the data processing modules, to function as (2) a data processing module accommodating unit accommodating the data processing modules, (2) a data-to-be-analyzed holding unit holding data-to-be-analyzed relating to the network, (3) a data processing definition information storing unit storing data processing definition information that defines steps that carry out the processing of the data-to-be-analyzed held in the data-to-be-analyzed holding unit using the one or a plurality of data processing modules, and (4) a data processing executing unit causing the data processing modules to carry out data processing based on the data processing definition information stored in the data processing definition information storing unit to obtain a data processing result.

The fourth present invention is characterized in that a data processing module comprising (1) a connection unit connecting to the network analysis apparatus, and (2) a data processing unit carrying out data processing in accordance with a request from the network analysis apparatus.

The fifth present invention is characterized in that a data processing program causing a computer to function as (1) a connection unit connecting to the network analysis apparatus, and (2) a data processing unit carrying out data processing in accordance with a request from the network analysis apparatus.

Advantageous Effects of Invention

According to the present invention, it is possible to provide a network analysis system capable of easily changing the configuration of analysis processing relating to the usage situation and/or the operational state of a network.

BRIEF DESCRIPTION OF DRAWINGS

FIG. 2A illustrates content of a processing rule according to the present embodiment.

FIG. 2B illustrates a processing rule according to another embodiment.

FIG. 3 illustrates an example content of a processing rule management table according to the present embodiment.

FIG. 4 illustrates an engine management table according to the present embodiment.

FIG. 6 is a sequence chart showing the operation when an engine is newly installed in the network analysis system according to the present embodiment.

FIG. 7A illustrates transitions in a table when an engine is newly installed in the network analysis system according to the present embodiment.

FIG. 7B illustrates an engine management table according to one embodiment.

FIG. 11A illustrates the content of a data processing frame generated when data processing is carried out for the first processing rule in the network analysis system according to the present embodiment.

FIG. 11B illustrates a data processing frame for carrying out a second processing operation according to one embodiment.

FIG. 11C illustrates a data processing frame for carrying out a third processing operation according to one embodiment.

FIG. 11D illustrates a data processing frame for completing processing of the data processing frame according to one embodiment.

FIG. 13A illustrates content of a data processing frame generated when data processing is carried out for the second processing rule in the network analysis system according to the present embodiment.

FIG. 13B illustrates a data processing frame for carrying out a second processing operation according to one embodiment.

FIG. 13C illustrates a data processing frame for carrying out a third processing operation according to one embodiment.

FIG. 13D illustrates a data processing frame for completing processing of the data processing frame according to one embodiment.

FIG. 13E illustrates a data processing frame having been processed according to one embodiment.

FIG. 13F illustrates a data processing frame having been processed according to one embodiment.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

(A) Preferred Embodiment

Embodiments of a network analysis system, as well as a network analysis apparatus and a network analysis program, and also a data processing module and a data processing program according to the present invention will now be described in detail with reference to the attached drawings. Note that a data processing module according to the present embodiment is an engine.

(A-1) Configuration of Embodiment

Figure 1:
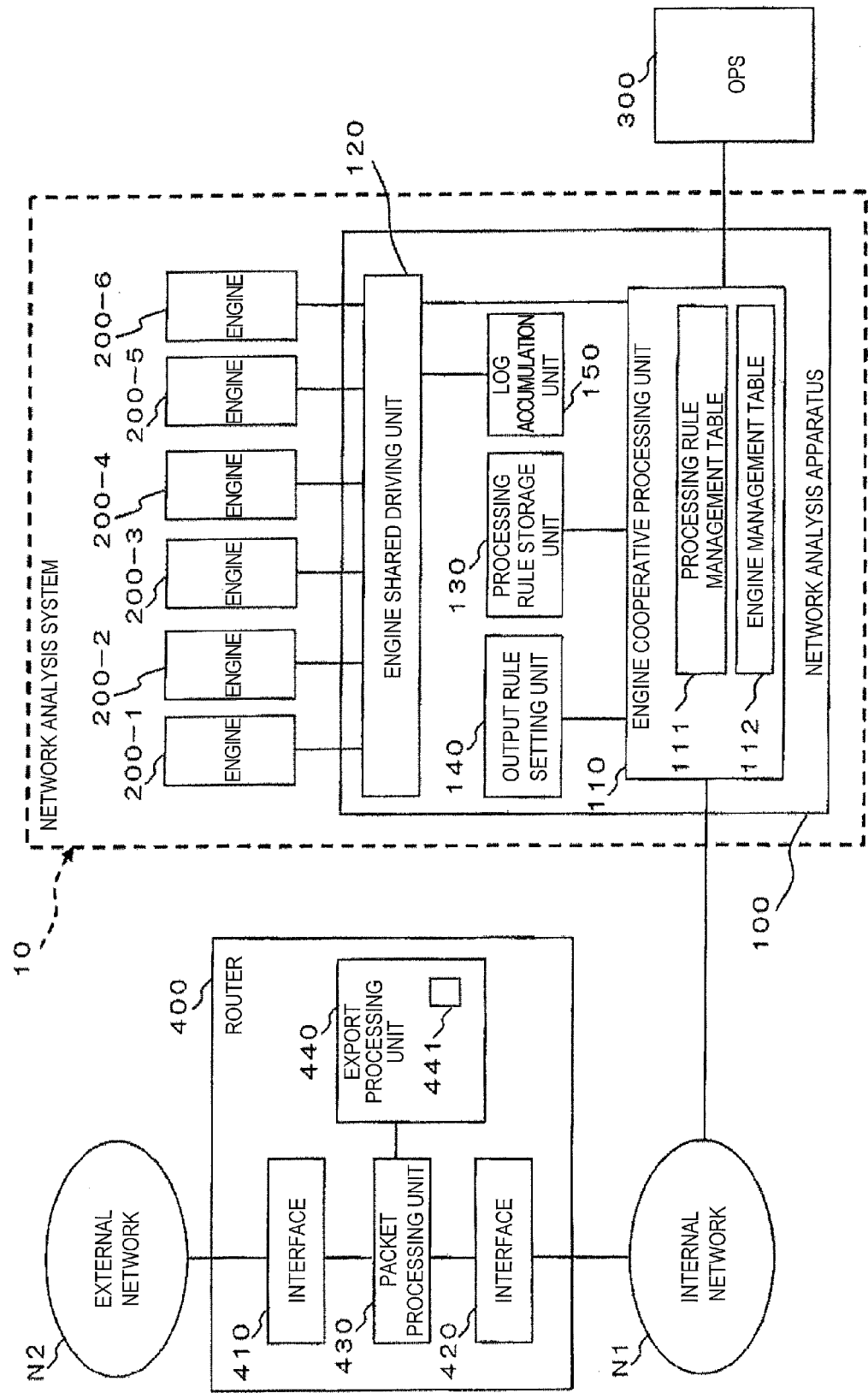
FIG. 1 illustrates a network analysis system according to an embodiment.

FIG. 1 is a block diagram showing the functional configuration of a network analysis system 10 according to the present embodiment.

The network analysis system 10 according to the present embodiment carries out analysis (for example, analysis of a usage situation and/or an operational state) relating to networks based on traffic flowing in a router 400 disposed between an internal network N1 and an external network N2 and outputs an analysis result. Note that there are no limitations on the traffic to be analyzed by the network analysis system 10. The network analysis system 10 then outputs the analysis result as necessary to an operating server (OPS) 300. As examples, the internal network N1 corresponds to a network of a communication carrier (for example, an ISP business) and the external network N2 corresponds to any network large or small, such as an upstream network like a Tier-1 ISP connected to the communication carrier, a network called a Private Peer that is a similar scale to the network N1, or a downstream network such as a smaller ISP or a private network. The router 400 for which the network analysis system 10 acquires data on the traffic which is necessary for analysis is assumed to be a network apparatus for connecting the internal network N1 to the external network N2. The OPS 300 corresponds for example to a terminal used by an operator who operates and monitors the internal network N1.

Next, the configuration of the router 400 will be described.

The router 400 includes an interface 410, an interface 420, a packet processing unit 430, and an export processing unit 440.

The interface 420 is assumed to be an interface for connecting to the internal network N1. The interface 410 is assumed to be an interface for connecting to the external network N2. Although there are no limitations on the types of interface for the internal network N1 and the external network N2, as examples it is possible to use a 10-gigabit Ethernet (registered trademark) interface or a gigabit Ethernet interface.

It is assumed that the packet processing unit 430 carries out processing (routing processing or the like) on packets transmitted and received by the interfaces 410, 420. Note that the packet processing unit 430 can be provided with the same configuration as an existing router. Note that the network analysis system 10 will be described as carrying out analysis relating to traffic (IP packets) that are transmitted/received and observed at the interface 410.

The export processing unit 440 functions as an exporter (agent) that gathers data that is necessary for analysis and transfers such data after processing as necessary in accordance with control from the network analysis system 10. The export processing unit 440 is equipped with an output rule storage unit 441 that stores information defining rules (hereinafter referred to as "output rules") relating to data outputted to the network analysis system 10. The export processing unit 440 changes the defined content of the output rule storage unit 441 in accordance with control from the network analysis system 10. The export processing unit 440 carries out the gathering of data in accordance with information stored in the output rule storage unit 441, processes the information as necessary, and supplies the information to the network analysis system 10. In the following description, at the network analysis system 10, the data supplied from the router 400 (the export processing unit 440) is referred to as "report data". Packets in which the report data transmitted from the router 400 (the export processing unit 440) has been inserted are also referred to as "report packets".

Since it is possible to apply the processing configuration of an exporter (agent) in an existing technology such as Netflow (see Reference Literature 1 (IETF RFC 3954)), IPFIX (see Reference Literature 2 (IETF RFC 5101)), or sFLOW (see Reference Literature 3 (IETF RFC 3176)) to the specific processing configuration of the router 400, detailed description thereof is omitted here.

Next, the configuration of the network analysis system 10 will be described.

The network analysis system 10 includes a network analysis apparatus 100 that functions as a platform of the system and engines 200 (200-1 to 200-6) that operate on the network analysis apparatus 100 (platform) and carry out data processing. Note that there is no limitation on the number of engines 200.

The network analysis apparatus 100 processes the data (report data) relating to traffic that has been supplied from the router 400 using some or all of the engines 200 and principally carries out analysis processing relating to the usage situation and/or the operational state of networks (the internal network N1 and the external network N2). That is, in the network analysis system 10, the respective engines 200 function as data processing modules for carrying out data processing of report data or the like. The network analysis apparatus 100 uses a combination of some or all of the engines 200 to carry out analysis of the usage situation and/or the operational state of networks.

The network analysis apparatus 100 includes an engine cooperative processing unit 110, an engine shared driving unit 120, a processing rule storage unit 130, an output rule setting unit 140, and a log accumulation unit 150.

The network analysis apparatus 100 may be constructed by installing the network analysis program according to the present embodiment or the like into an apparatus including an execution configuration for programs (such as a CPU, ROM, RAM, EEPROM, and a hard disk drive) and an interface for connecting to a network. The functional configuration in such case can be as shown in FIG. 1. The network analysis apparatus 100 may also be partly or entirely constructed using hardware (for example, a dedicated chip or the like).

The engine cooperative processing unit 110 receives the report packets transmitted from the router 400 and extracts the report data. Note that as the processing configuration whereby the engine cooperative processing unit 110 receives the report packets and extracts the report data, it is possible for example to use the same configuration as a collector (manager) that corresponds to an exporter (agent) in the existing technologies in Reference Literature 1 to 3 mentioned above.

The engine cooperative processing unit 110 causes the engines 200 to carry out processing of the extracted report data in accordance with processing rules stored in the processing rule storage unit 130 for such report data. The engine cooperative processing unit 110 carries out communication via the engine shared driving unit 120 when inputting into and outputting out of the engines 200, such as when controlling or requesting processing to the engines 200.

The engine shared driving unit 120 carries out functions such as connecting the engines 200, the engine cooperative processing unit 110, and the log accumulation unit 150 and communication processing (switching processing) between the respective elements. That is, the engine shared driving unit 120 functions so as to accommodate the engines 200 inside the network analysis apparatus 100.

The following description is given on the assumption that the engines 200-1 to 200-6 have been given the identifiers (hereinafter referred to as "engine IDs") "1" to "6". As examples, the identifier of the engine 200-1 is "1" and the identifier of the engine 200-2 is In the processing rule storage unit 130, data that defines rules (hereinafter referred to as "processing rules") relating to processing steps or the like when the engine cooperative processing unit 110 carries out data processing using the engines 200 is stored. Such processing rules are described in detail later.

The processing rules stored in the processing rule storage unit 130 are managed in a processing rule management table 111 of the engine cooperative processing unit 110. In the processing rule management table 111, information relating to the respective processing rules (such as the format of report data to be inputted, the engines 200 used for processing, and the types of engines 200) is managed. The processing rule management table 111 is described in detail later.

The output rule setting unit 140 requests the router 400 (the export processing unit 440) to set the transmission content and conditions of the report data in accordance with information managed in the processing rule management table 111 so as to make it possible to acquire the report data required by respective processing rules. As the configuration with which the output rule setting unit 140 requests the router 400 (the export processing unit 440) to set transmission content and conditions of the report data, as one example it is possible to use the same configuration as a collector (manager) that corresponds to an exporter (agent) disclosed in the existing technologies of Reference Literature 1 to 3 mentioned above.

As described above, the report data transmitted from the router 400 (the export processing unit 440) is acquired by the engine cooperative processing unit 110. That is, in the network analysis apparatus 100, processing that holds the report data (data to be analyzed by the network analysis apparatus 100) from the router 400 (the export processing unit 440) is carried out by the output rule setting unit 140 and the engine cooperative processing unit 110.

The log accumulation unit 150 is connected to the engine shared driving unit 120 and accumulates a log relating to processing by the respective engines 200. Input data and/or output data, intermediate data of data processing, or the like are stored for each engine 200 in the log accumulation unit 150. As one example, it is assumed here that the engine shared driving unit 120 supplies data inputted and outputted into and out of the respective engines 200 and data based on requests from the respective engines 200 in the log accumulation unit 150 and that the data supplied to the log accumulation unit 150 is accumulated having been sorted for the respective engines 200.

Next, the specific content of the processing rules stored in the processing rule storage unit 130 will be described. Here, it is assumed that two rules R1 and R2 are stored in the processing rule storage unit 130.

FIGS. 2A and 2B are diagrams useful in explaining an example of the defined content of the processing rules stored in the processing rule storage unit 130.

FIG. 2A shows the content of the processing rule R1 and FIG. 2B shows the content of the processing rule R2.

Although there are no limitations on the description format defining a processing rule, as shown in FIGS. 2A and 2B, it is assumed here that processing rules are described in a C language-type script format.

In broad terms, a processing rule includes three steps, that is, a step of defining the report data to be used as input data (hereinafter referred to as the "input data definition step") (step S101 in FIG. 2A and step S201 in FIG. 2B), a step of defining data processing that uses the engines 200 (hereinafter referred to as the "data processing definition step") (step S102 in FIG. 2A and step S202 in FIG. 2B), and a step of defining the data outputted by such processing rule (hereinafter referred to as the "output data definition step") (step S103 in FIG. 2A and step S203 in FIG. 2B).

First, the input data definition step (step S101, step S201) will be described. In the present embodiment, it is assumed that the format of the input data (report data) to be used in the processing rule is one or both of "traffic data" such as pcap format where traffic observed at an interface is dumped (binary data of an IP packet sequence generated at specified intervals) and a "flow record" where traffic observed at an interface is extracted at a set sampling interval and outputted as flow information such as netflow/sflo/ipfix (statistical information of a specified item relating to IP packet sequence generated at specified intervals). Although the format of the input data (report data) may be defined with even more detailed classifications, the present embodiment is described using only the two types described above for ease of explanation.

In the input data definition step of the processing rule R1 (step S101), "input1=trafficdata;" is described showing that "input1" (the format of the first input data of the processing rule R1) has the "trafficdata" format.

Meanwhile, in the input data definition step of the processing rule R2 (step S102), "input1=flow_record;" is described showing that "input1" (the format of the first input data of processing rule R2) has the "flow_record" format. Note that in the input data definition step, it is also possible to make definitions relating to a plurality of input data with a description such as "input2= . . . ", for example.

Next, the data processing definition step that configures a processing rule (step S102, step S202) will be described. As shown in FIG. 2A, the data processing definition step (step S102) of the processing rule R1 has three substeps S102-1 to S102-3. Also, the data processing definition step (step S202) of processing rule R2 has three substeps S202-1 to S202-3.

The data processing definition step defines processing to be carried out by the respective engines 200, using functions (classes) whose name (class name) is "EngineN" (where N is an identifier (any of 1 to 6) of the engine in question). In the data processing definition step, if processing is to be carried out by an arbitrary engine 200 (the engine 200 whose identifier is "EngineN") for arbitrary input data ("inputdata") while designating an arbitrary parameter ("parameter") (for example, a threshold when data processing is carried out) and data is to be outputted in an arbitrary data format ("output_type"), such processing can be expressed using the description "EngineN (inputdata, output_type, parameter). Although there are no limitations on the description format in the data processing definition step and it is possible for the system to be compatible with a plurality of description formats, for ease of explanation, the description here assumes that the network analysis apparatus 100 is compatible with the format mentioned above. Note that in the data processing definition step, in cases where it is unnecessary to clearly designate parameters aside from inputdata (i.e., output_type and parameter), description of such parameters may be omitted. Note also that in the following description, the parameters aside from inputdata are referred to as "additional parameters". Also, although "output_type" and "parameter" are described as "output_type1" and "parameter1" in FIG. 2A for "output_type" and "parameter" for ease of the explanation, it is assumed that in reality, data (not shown) that defines the specific content for such parameters is held in the engine cooperative processing unit 110.

For example, although "Engine1(input1,output_type1,parameter1)" is described in the step S102-1 that composes the data processing definition step (S102) of the processing rule R1, this means that "Engine1" (engine 200-1) is caused to carry out processing on "input1" (input data defined in step S101) with the designated parameter "parameter1" to obtain output data with the output format "output_type1".

Next, the content of the data processing definition step (step S102) of the processing rule R1 will be described.

The content of step S102-1 is as described above.

Since "Analyze2=Engine2(analyze1, output_type2, parameter2);" is described in step S102-2 that follows step S102-1, this refers to processing that causes "Engine2" (engine 200-2) to carry out data processing with "Analyze1" obtained in step S102-1 as an input and has the result substituted into a variable called "Analyze2".

Since "Analyze3=Engine3(analyze2, output_type3, parameter3);" is described in step S102-3 that follows step S102-2, this refers to processing that causes "Engine3" (engine 200-3) to carry out data processing with "Analyze2" obtained in step S102-2 as an input and has the result substituted into a variable called "Analyze3".

That is, in the data processing definition step (step S102) of the processing rule R1, a nested structure (syntax) where the engine 200-1 (Engine1) is first caused to carry out processing on the input data (input1), the engine 200-2 (Engine2) is caused to further process the result of such processing, and then the engine 200-3 (Engine3) is caused to further process the result of such processing is described. In other words, the data processing definition step (step S102) of the processing rule R1 has a structure (syntax) where the input data (input1) is serially processed in the order of the engine 200-1 (Engine1), the engine 200-2 (Engine2), and the engine 200-3 (Engine3).

Next, an example of the specific processing (the specific processing by the engines 200-1 to 200-3) of the data processing definition step (step S102) of the processing rule R1 will be described.

In the processing rule R1, it is assumed that traffic relating to real-time communication such as audio or video flowing in the router 400 is analyzed. More specifically, it is assumed that the processing rule R1 carries out analysis that extracts packets during RTP/RTCP (Real-time Transport Protocol/RTP Control Protocol) communication (in particular, RTCP packets).

First, in step S102-1, traffic data (data of all of the IP packets) is inputted into the engine 200-1 (Engine1) as input data (input1) and data (Analyze1) produced by extracting only the RTCP packets is obtained. The data (Analyze1) of RTCP packets obtained by the engine 200-1 (Engine1) is inputted into the engine 200-2 (Engine2), a combination of IP addresses that appear at least a specified number of times (designated by Parameter2) is extracted from combinations of IP addresses (i.e., combinations of IP addresses of the transmission source and transmission destination of RTCP packets) of flows where it is believed, based on quality values (such as a delay or packet loss) included in the RTCP packets that the communication quality has significantly deteriorated, and data (Analyze2) that includes data on such combination of such IP addresses and data on parameter values relating to communication quality included in the RTCP packets relating to such combination (average values may be used if a plurality of parameter values exist) is obtained. The combination of IP addresses and data (Analyze2) on parameter values relating to such combination that have been obtained by the engine 200-2 (Engine2) are inputted into the engine 200-3 (Engine3), it is determined that there is a network abnormality if the number of times quality deterioration occurs within a certain period exceeds a threshold and such determination result and combination of IP addresses are obtained as Analyze3. The determination result (Analyze3) outputted from the engine 200-3 (Engine3) returns a pair of the IP addresses for which network quality deterioration has been determined within the certain period or returns "0" if there has been no deterioration in quality. In the present embodiment, by using the processing rule R1, it is possible, with the flow described above, to have data processing carried out on the input data (input1: trafficdata) serially by the engines 200-1 to 200-3 and to determine whether there are any network abnormalities.

Next, the content of the data processing definition step (step S202) of the processing rule R2 will be described.

Although the input data (input1) is serially processed by a plurality of engines with the processing rule R1 as described above, processing is carried out in parallel with the processing rule R2.

More specifically, in step S202-1 of the processing rule R2, processing of the input data (input1) is carried out by the engine 200-4 (Engine4) and the result of such processing is substituted into a variable called "Analyze1". In step S202-2 of the processing rule R2, processing of the input data (input1) is carried out by the engine 200-5 (Engine5) and the result of such processing is substituted into a variable called "Analyze2". In addition, in step S202-3 of the processing rule R2, processing of the input data (input1) is carried out by the engine 200-6 (Engine6) and the result of such processing is substituted into a variable called "Analyze3".

Next, an example of the specific processing (the specific processing by the engines 200-4 to 200-6) of the data processing definition step (step S202) of the processing rule R2 will be described.

The engines 200-4 to 200-6 accumulate input data in the format of a flow record, carry out processing that uses respectively different algorithms to judge whether there are presently any network abnormalities based on data accumulated in the past and the most recently obtained data in flow record format, and obtain such determination results as Analyze1 to Analyze3. Here, as one example, it is assumed that the engine 200-4 determines that a network abnormality has occurred if an IP address or route that is the cause of at least a certain proportion (designated by parameter1) of errors has been obtained using the degree of change in trend in the same way as the technology disclosed by Patent Literature 1. It is assumed that the engine 200-5 determines whether there is a network abnormality (quality deterioration on the network) at present based on a determination using the RF method in the same way as the technology disclosed by Patent Literature 3. In addition, it is assumed that the engine 200-6 determines whether there is a network abnormality (quality deterioration on the network) at present using a learning machine that uses a neural network (neuro) in the same way as the technology disclosed by Patent Literature 4.

It is assumed that the determination results (Analyze1 to Analyze3) outputted from the engines 200-4 to 200-6 (Engine4 to Engine6) take the value "1" when it has been determined that there is a network abnormality and take the value "0" if it has been determined that there is no network abnormality. In the present embodiment, with the flow described above, with the processing rule R2, it is possible to have data processing carried out on the input data (input1: flow_record) in parallel by the engines 200-4 to 200-6 and to obtain determination results relating to network failures using respectively different algorithms Next, the output data definition step (step S103, step S203) that constructs a processing rule will be described.

In the output data definition step (step S103) of the processing rule R1, as shown in FIG. 2A, "Return analyze3;" is simply described, which shows that the variable called "analyze3" as a processing result of the processing rule R1 is outputted as data on a return value. In the engine cooperative processing unit 110, for each of the processing rules, processing that acquires data outputted as a return value and outputs such data as the analysis result of such processing rule is carried out by a function called "Return".

In the output data definition step that constructs the processing rules in the present embodiment, it is assumed that "1" is outputted as the return value if the result of the analysis processing is that an abnormality relating to the usage situation and/or the operational state of the network has been detected and "0" is outputted as the return value if there is no abnormality (i.e., in the normal state).

Meanwhile, in the output data definition step (step S103) of the processing rule R2, as shown in FIG. 2A, "If ((analyze1+analyze2+analyze3)>2) return 1; Else return 0;" is described in the form of syntax that uses an If statement. Here, as described above, "0" or "1" is substituted into each of "analyze1", "analyze2", and "analyze3". With the syntax that uses an If statement described above, if "1" has been substituted into at least two out of the "analyze1", "analyze2", and "analyze3", the If condition is satisfied and "1" is outputted as the return value of the processing rule R2. Meanwhile if the If condition is not satisfied (i.e., if the number of engines 200 that have outputted "1" is less than two), "0" is outputted as the return value of the processing rule R2.

As described above, the engines 200-4 to 200-6 determine whether there is a network-related failure using respectively different algorithms. Accordingly, it can be said that with the output data definition step of processing rule R2 (step S203), a final determination result determines that a network abnormality is present only when a network abnormality has been detected by at least two out of the engines 200-4 to 200-6 (i.e., when the engines 200 that have detected a network abnormality are in a majority). As described above, with the processing rule R2, the determination results of a plurality of engines 200 are totaled to make a final determination of whether there is a network abnormality.

As described above, the scripts of the respective processing rules are carried out by the network analysis apparatus 100. If as a result of executing the scripts of the processing rules, "1" meaning that an abnormality has been detected has been acquired as a return value, the engine cooperative processing unit 110 carries out processing that notifies the OPS 300 that an abnormality has been detected by such processing rule (for example, notification processing that uses a Trap or the like of SNMP). When giving notification of the occurrence of a network abnormality, the engine cooperative processing unit 110 may give notification together with a message corresponding to each processing rule (for example, a message showing the cause of the abnormality). The engine cooperative processing unit 110 may manage the messages that notify the OPS 300 through management of the processing rule management table 111 with additional items, or such messages may be described in the output data definition step.

Note that there are no limitations on the method by which the engine cooperative processing unit 110 outputs the analysis results, and as examples, it is possible to internally accumulate the results as a log (history) or to output by displaying on a display or the like not at the OPS 300 but at the present apparatus.

In the OPS 300, if there has been an error notification from the engine cooperative processing unit 110 (for example, if a Trap notification has been given via SNMP), a warning indicating the abnormality is issued to inform the operator that an abnormality has occurred on the network. Although there are no limitations on the method of having the OPS 300 issue a warning, it is possible to use various methods, such as outputting by displaying on a display, not shown, giving an audio output of an alarm sound using a speaker, not shown, or lighting a lamp, not shown. Although there are no limitations on the specific configuration of the OPS 300, it is possible for example to apply a network monitoring apparatus (SNMP manager) that is compatible with existing SNMP.

Next, the example content of the processing rule management table 111 held in the engine cooperative processing unit 110 will be described.

FIG. 3 is a diagram useful in explaining an example content of the processing rule management table 111. FIG. 3 shows the content of the processing rule management table 111 for a case where the processing rules R1, R2 in FIGS. 2A and 2B, described above, are stored in the processing rule storage unit 130.

As shown in FIG. 3, information on items such as rule ID, used engines, interval, and input data format are registered in the processing rule management table 111. In FIG. 3, information relating to one processing rule is managed on one row.

The "rule ID" item is an item showing the identifier of each processing rule. Here, a case where the rule ID of the processing rule R1 is "1" and the rule ID of the processing rule R2 is "2" is described.

The "used engines" item is an item used to manage the engines 200 used in the "data processing definition step" of such processing rule. As shown in FIG. 3, a value "1" or "0" is set for the engine ID of each engine in the "used engines" item. If the value corresponding to an engine ID is zero in the "used engines" item, this means that the engine 200 with such engine ID is not used by such processing rule. Meanwhile, if the value corresponding to an engine ID is one in the "used engines" item, this means that the engine 200 with such engine ID is used by such processing rule. As one example, for the processing rule R1 (where rule ID:1), it is indicated that the engines 200-1 to 200-3 whose engine IDs are 1 to 3 are used.

The "interval" item shows the interval (gap) for carrying out the script of such processing rule. The interval may be shown in units of time or may be shown as a generated number of packets (the number of packets included in the report data supplied from the router 400). The "input data format" item shows the format of the input data defined in the input data definition step of such processing rule.

In FIG. 3, the interval of the processing rule R1 (ruleID:1) is "10000 packets" and the input data format is "trafficdata". Accordingly, it is shown that when the number of packets (the number of packets included in the report data supplied from the router 400) generated from the previous execution of the processing rule R1 reaches 10,000, the engine cooperative processing unit 110 starts the execution of the processing rule R1 with report data in the trafficdata format including such 10,000 packets of data as an input.

In FIG. 3, the interval of the processing rule R2 (rule ID:2) is "10s" and the input data format is "flow_record". Accordingly, it is shown that when 10 seconds have elapsed from the previous execution of the processing rule R2, the engine cooperative processing unit 110 starts the execution of processing rule R2 with the report data in the flow_record format supplied during such 10 seconds as an input.

The content of the processing rule management table 111 may register content in accordance with user operations and may be updated by the engine cooperative processing unit 110 in accordance with the content of a processing rule added to the processing rule storage unit 130.

The engine cooperative processing unit 110 is not limited to a unit that grasps the information of the respective items in the processing rule management table 111 for the processing rules. As one example, information on the respective items of the processing rule management table 111 may be stored together with data on the processing rules in the processing rule storage unit 130 and read into the engine cooperative processing unit 110. The engine cooperative processing unit 110 may refer to the content of the script of the processing rule stored in the processing rule storage unit 130 and reflect the content in the processing rule management table 111. As one example, if a new processing rule has been added to the processing rule storage unit 130, the engine cooperative processing unit 110 may read the content of the input data definition step that configures such processing rule, grasp a confirmation (trafficdata or flow_record) of the format of the input data of such processing rule, and reflect such information in the "input data format" item. Also, for example, if a new processing rule has been added to the processing rule storage unit 130, the engine cooperative processing unit 110 may read the content of the data processing definition step that configures such processing rule, grasp the engines 200 (engine IDs) to be used for such processing rule, and reflect such information in the "used engines item.

Next, an example content of an engine management table 112 held in the engine cooperative processing unit 110 will be described.

FIG. 4 is a diagram useful in explaining an example content of the engine management table 112. FIG. 4 shows the content of the engine management table 112 in a case where the engines 200-1 to 200-6 (engine ID: 1 to 6) are connected to the engine shared driving unit 120.

As shown in FIG. 4, information on the items "engine ID", "IF number", "engine name" and "processing summary" are registered in the engine management table 112. In FIG. 4, the information relating to one processing rule is managed on one row.

The "engine ID" item shows the engine ID (an ID used in the definition of a processing rule or the like) assigned to such engine 200.

The "IF number" item shows the number of an interface (the identifier of a logical or physical interface) to which the engine 200 is installed on the engine shared driving unit 120.

Although the engine IDs and the IF numbers of the respective engines 200 are described as separate items in FIG. 4, if the content matches, the engine IDs and the IF numbers may be collectively described in a single item.

The "engine name" item shows the name of such engine 200. The "processing summary" item shows a summary of the processing of the engine 200. Note that the "engine name" and "processing summary" items are not essential items for the engine management table 112 and may be omitted.

If an engine 200 has been newly installed (i.e., connected to the engine shared driving unit 120) or an engine 200 that has already been installed has been uninstalled (i.e., disconnected from the engine shared driving unit 120), the engine cooperative processing unit 110 updates the content of the engine management table 112. Such processing will be described as part of the description of the operation given later.

Next, the internal configuration of the engines 200 (200-1 to 200-6) will be described.

Here, since the fundamental configurations (frameworks) of the respective engines 200 are all the same, only engines where the content of the data processing to be executed is different will be described.

Figure 5:
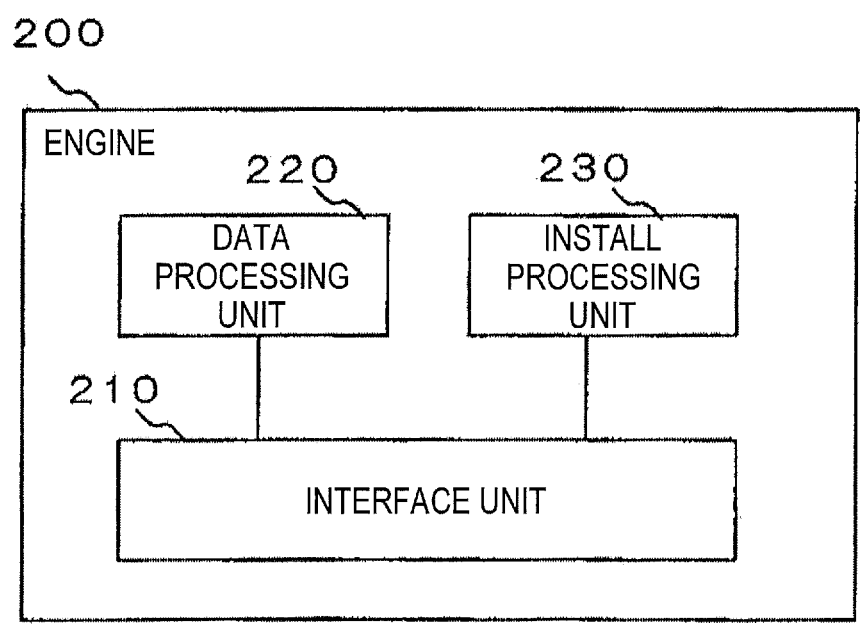
FIG. 5 illustrates the functional configuration of an engine according to the present embodiment.

FIG. 5 is a block diagram showing the functional configuration of the respective engines 200.

The engines 200 may be constructed by installing a data processing program according to the present embodiment into hardware (a computer) that is separate to the network analysis apparatus 100 or may be constructed as one program (a data processing program according to the present embodiment) that operates on a computer that is the network analysis apparatus 100. In either case, the functional configuration of the engines 200 can be as shown in FIG. 5.

An engine 200 includes an interface unit 210, a data processing unit 220, and an install processing unit 230.

The interface unit 210 functions as an interface for connecting to the engine shared driving unit 120. If the engine 200 is constructed using hardware (a computer) that is separate to the engine shared driving unit 120, it is necessary for the interface unit 210 to be equipped with an interface for physically connecting to the network analysis apparatus 100 (the engine shared driving unit 120). Although there are no limitations on the interface if the engine 200 is connected to the engine shared driving unit 120 using hardware, as examples it is possible to use a LAN interface such as Ethernet or various interfaces such as a fiber channel.

The data processing unit 220 functions so as to carry out data processing based on a request from the engine cooperative processing unit 110. The content of the specific data processing carried out by the data processing unit 220 differs according to the specification of the engine 200 in question. The data processing unit 220 may internally manage a work memory used when carrying out data processing and/or a detailed operation log, or part or all of such information may be stored in a region reserved in the log accumulation unit 150. In such case, it is necessary to configure the respective engines 200 so as to be capable of reading and writing data accumulated in the log accumulation unit 150 via the engine shared driving unit 120.

The install processing unit 230 carries out processing that connects to the network analysis apparatus 100 and installs the engine 200 and processing that disconnects (uninstalls) the engine 200 from a connected (installed) state to the network analysis apparatus 100. As one example, the installation process and uninstallation process by the install processing unit 230 may be carried out in accordance with a user operation. If the engine 200 is configured with software by a program (the data processing program according to the present embodiment) the install processing unit 230 is configured as a subprogram that composes such program. When a subprogram corresponding to the install processing unit 230 has been executed by the user (for example, a specified command operation), installation or uninstallation processing is commenced. If the engine 200 is hardware that is separated to the network analysis apparatus 100, the user may directly operate the engine 200 (the install processing unit 230) (for example, operation made via an interface such as a button, not shown), or may operate the engine 200 (the install processing unit 230) via the network analysis apparatus 100.

When the installation or uninstallation process commences, the install processing unit 230 carries out processing in cooperation with the engine cooperative processing unit 110. A specific sequence of the processing by the install processing unit 230 will be described as part of the description of the operation given later.

(A-2) Operation of the Present Embodiment

Next, the operation of the network analysis system 10 according to the present embodiment with the configuration described above will be described.
(A-2-1) Engine Installation First, the operation when a new engine is installed into the network analysis system 10 will be described with reference to the sequence chart in FIG. 6.

Here, FIG. 6 shows an operation where an engine 200-7 is newly installed in a state where the engines 200-1 to 200-6 have been installed on the network analysis apparatus 100. In this description, it is assumed that as the initial state of the flowchart in FIG. 6, the contents of the processing rule management table 111 and the engine management table 112 are in the states shown in FIGS. 3 and 4 respectively.

First, it is assumed that the engine 200-7 has been placed by a user operation in a state that can be accessed by the engine shared driving unit 120 and the install processing unit 230 of the engine 200-7 has been activated (S301). If the engine 200 has a software configuration using a program (the data processing program according to the present embodiment), as one example, once a file of the program that configures the engine 200-7 has been expanded in a computer that configures the network analysis apparatus 100 and placed in an executable state, the engine 200-7 is placed in an accessible state for the engine shared driving unit 120. Also, if the engine 200 is constructed by hardware (a computer) that is separate to the network analysis apparatus 100, as one example, once the hardware (module) of the engine 200-7 has been connected to the network analysis apparatus 100 (for example, connection using a cable and an interface such as a socket), the engine 200-7 is placed in an accessible state for the engine shared driving unit 120.

When the install processing unit 230 of the engine 200-7 is activated, notification of an install request is given from the install processing unit 230 via the engine shared driving unit 120 to the engine cooperative processing unit 110 (S302).

When such notification of an install request is received, the engine cooperative processing unit 110 gives notification of a transmission request for management information (information to be registered in the engine management table 112) to the engine 200-7 (S303).

When the transmission request of the management information has been received, the install processing unit 230 of the engine 200-7 sends management information of the engine 200-7 to the engine cooperative processing unit 110 (S304).

When management information is received, the engine cooperative processing unit 110 assigns an engine ID to the engine 200-7. The engine cooperative processing unit 110 then adds information relating to the engine 200-7 to the engine management table 112 based on the received management information and the assigned engine ID. In addition, the engine cooperative processing unit 110 adds the engine ID item of the engine 200-7 to the "used engines" item of the processing rule management table 111 (S305).

FIGS. 7A and 7B show the states of the processing rule management table 111 and the engine management table 112 after updating by the processing in step S305 described above.

When assigning an engine ID to the engine 200 that has been newly installed, the engine cooperative processing unit 110 confirms the engine management table 112 and assigns an unused engine ID. Here, it is assumed that the engine cooperative processing unit 110 assigns the lowest number out of the unused engine IDs to the engine 200-7. As described above, since the state of the engine management table 112 before step S305 is the state shown in FIG. 4 described above, the engine cooperative processing unit 110 assigns "7" as the engine ID to the engine 200-7. Note that the engine ID assigned to the engine 200 that is newly installed may be a number in accordance with a user operation, or an ID or the like that is set in a fixed manner may be assigned in accordance with the type or the like of the engine 200. The engine cooperative processing unit 110 additionally registers information on the engine 200-7 in the engine management table 112 with "7" as the engine ID of the engine 200-7 and the engine management table 112 becomes the state shown in FIG. 7B. The engine cooperative processing unit 110 then adds an item (the item where the engine ID is "7") corresponding to the engine 200-7 to the "used engines" item of the processing rule management table 111 and the processing rule management table 111 becomes the state shown in FIG. 7A. In the processing rule management table 111, since the engine 200-7 will not be used by any of the processing rules when the item corresponding to the engine 200-7 (the item where the engine ID is "7") has just been added, the values "0" are set.

On completing the updating of the respective tables (the processing rule management table 111 and the engine management table 112), the engine cooperative processing unit 110 gives the engine 200-7 notification of the completion of installation and also notification of the assigned engine ID (7) (S306).

After this, it becomes possible for the engine 200-7 to carry out data processing on the network analysis apparatus 100.

(A-2-2) Engine Uninstallation

Next, an operation where an engine 200 that has already been installed (connected) is uninstalled from the network analysis system 10 will be described.

If there has been an uninstallation request from an engine 200 (the install processing unit 230), the engine cooperative processing unit 110 confirms the influence that would be caused by uninstalling the engine 200 and determines, based on such confirmation result, whether it is possible to uninstall the engine 200. More specifically, if there has been an uninstallation request from the engine 200 (the install processing unit 230), the engine cooperative processing unit 110 refers to the processing rule management table 111, determines that uninstalling the engine 200 will have no influence if there are no processing rules that use such engine 200, and permits uninstallation of the engine 200. Meanwhile, if there is a processing rule that uses such engine 200, the engine cooperative processing unit 110 does not permit uninstallation of the engine 200.

Here, an operation when the engine cooperative processing unit 110 determines that an uninstallation request from the engine 200 is possible will be described first with reference to FIG. 8.

Figure 8:
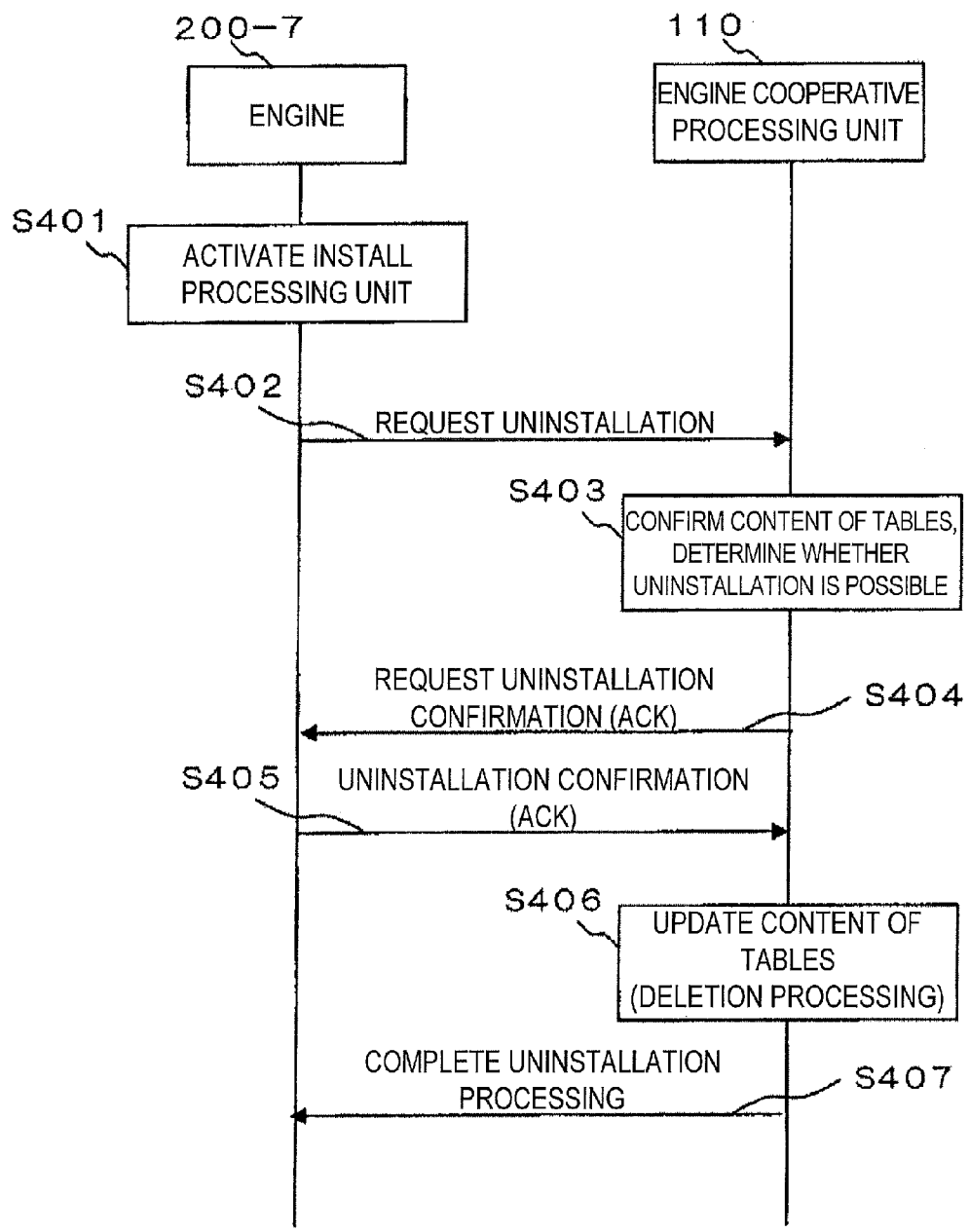
FIG. 8 is a sequence chart showing the operation when an engine is to be uninstalled (when uninstallation is possible) in the network analysis system according to the present embodiment.

FIG. 8 shows an operation that carries out uninstallation of the engine 200-7 in a state immediately after the engine 200-7 has been newly installed in FIG. 6 described above. That is, in the flowchart in FIG. 8, it is assumed that the initial states of the processing rule management table 111 and the engine management table 112 are the states shown in FIGS. 7A and 7B, described above.

First, it is assumed that the install processing unit 230 of the engine 200-7 is activated by a user operation in a state where the engine 200-7 has been installed on the network analysis apparatus 100 (S401).

Once the install processing unit 230 of the engine 200-7 has been activated, notification of an uninstallation request is given from the install processing unit 230 via the engine shared driving unit 120 to the engine cooperative processing unit 110 (S402).

Next, when notification of the uninstallation request has been received, the engine cooperative processing unit 110 confirms the content of the processing rule management table 111 and determines whether it is possible to uninstall the engine 200-7 (S403).

As described above, the content of the processing rule management table 111 is the state in FIG. 7A, described above. As shown in FIG. 7A, the items corresponding to the engine 200-7 (the items where the engine ID is "7") are set at the value "0" (i.e., the value showing that the engine is not used) for all of the processing rules. Accordingly, since the engine 200-7 is not used by any of the processing rules, the engine cooperative processing unit 110 determines that there will be no influence even if the engine 200-7 is uninstalled and that it is possible to uninstall the engine 200-7.

On determining that the uninstallation of the engine 200-7 is possible, the engine cooperative processing unit 110 gives notification of a final confirmation (ACK) request for the uninstallation (S404).

On receiving notification of the confirmation (ACK) request for the uninstallation, the install processing unit 230 of the engine 200-7 sends a confirmation (ACK) of the uninstallation (S405).

On receiving notification of the confirmation (ACK) of the uninstallation, the engine cooperative processing unit 110 carries out the deletion of information relating to the engine 200-7 from the processing rule management table 111 and the engine management table 112 (S406).

The engine cooperative processing unit 110 deletes information on the engine 200-7 (engine ID:7) from the engine management table 112 so that the engine management table 112 becomes the state shown in FIG. 4 described above. The engine cooperative processing unit 110 also deletes items corresponding to the engine 200-7 (items where the engine ID is "7") from the "used engines" item in the processing rule management table 111 so that the processing rule management table 111 becomes the state shown in FIG. 3 described above.

The engine cooperative processing unit 110 transmits a notification that the uninstallation process is completed to the engine 200-7 (S407). Through the operation in the sequence described above, the uninstallation process of the engine 200-7 in the network analysis system 10 ends, and it becomes possible to delete or remove the file for the engine 200-7.

Figure 9:
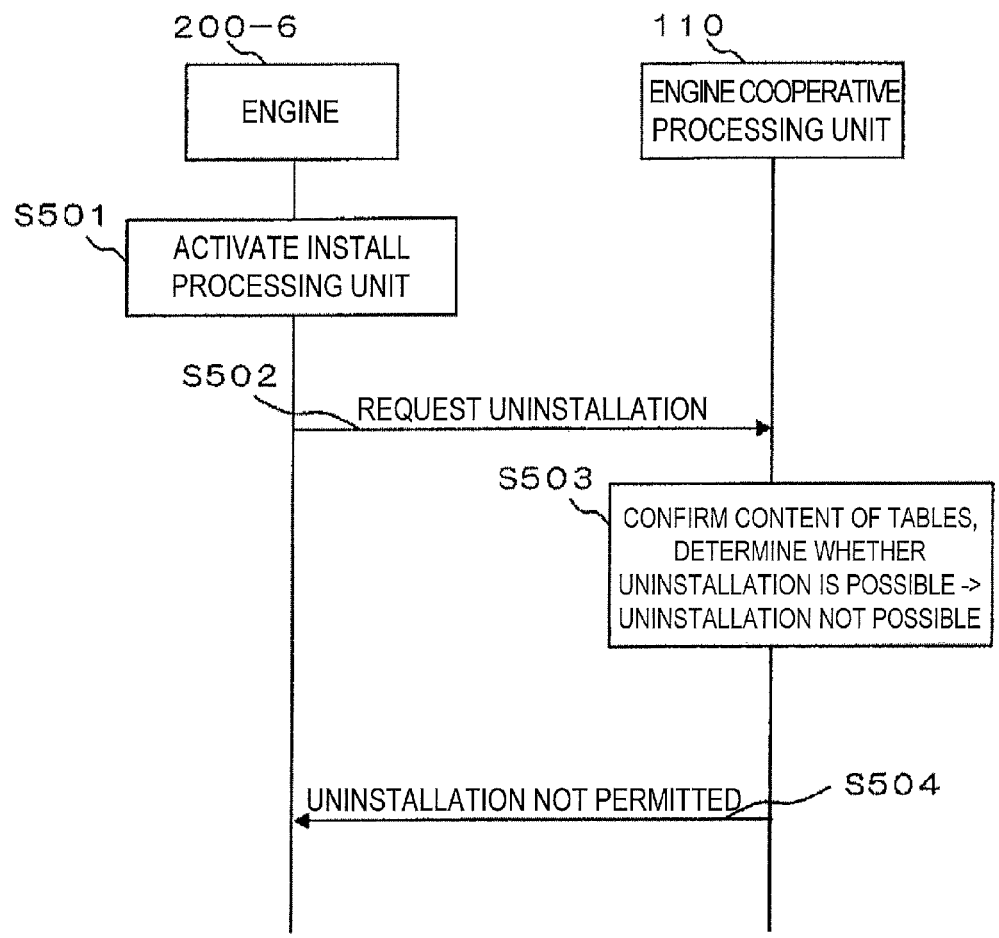
FIG. 9 is a sequence chart showing the operation when an engine is to be uninstalled (when uninstallation is not possible) in the network analysis system according to the present embodiment.

Next, the operation when the engine cooperative processing unit 110 determines that the uninstallation request from the engine 200 is not possible will be described using FIG. 9. The flowchart in FIG. 9 is also described on the assumption that the initial states of the processing rule management table 111 and the engine management table 112 are the states shown in FIGS. 7A and 7B, described above.

First, it is assumed that the install processing unit 230 of the engine 200-6 is activated by a user operation in a state where the engine 200-6 has been installed on the network analysis apparatus 100 (S501).

Once the install processing unit 230 of the engine 200-6 has been activated, notification of an uninstallation request is given from the install processing unit 230 via the engine shared driving unit 120 to the engine cooperative processing unit 110 (S502).

Next, when notification of the uninstallation request has been received, the engine cooperative processing unit 110 confirms the content of the processing rule management table 111 and determines whether it is possible to uninstall the engine 200-6 (S503).

As described above, the content of the processing rule management table 111 is the state in FIG. 7A, described above. As shown in FIG. 7A, the value "1" (i.e., the value showing that the engine is used) is set on the row of the processing rule R2 (the row where the rule ID is "2") in the item corresponding to the engine 200-6. Accordingly, since a processing rule that uses the engine 200-6 is present, the engine cooperative processing unit 110 determines that there will be an influence if the engine 200-6 is uninstalled and that it is not possible to uninstall the engine 200-6.

On determining that the uninstallation of the engine 200-6 is not possible, the engine cooperative processing unit 110 transmits notification that uninstallation is not possible to the engine 200-6 (S504) and cancels the uninstallation process.

(A-2-3) Data Processing Relating to a Processing Rule

Next, the specific operation (sequence) where the engine cooperative processing unit 110 causes the respective engines 200 to carry out data processing based on the script (data processing definition step) of a processing rule will be described.

Figure 10:
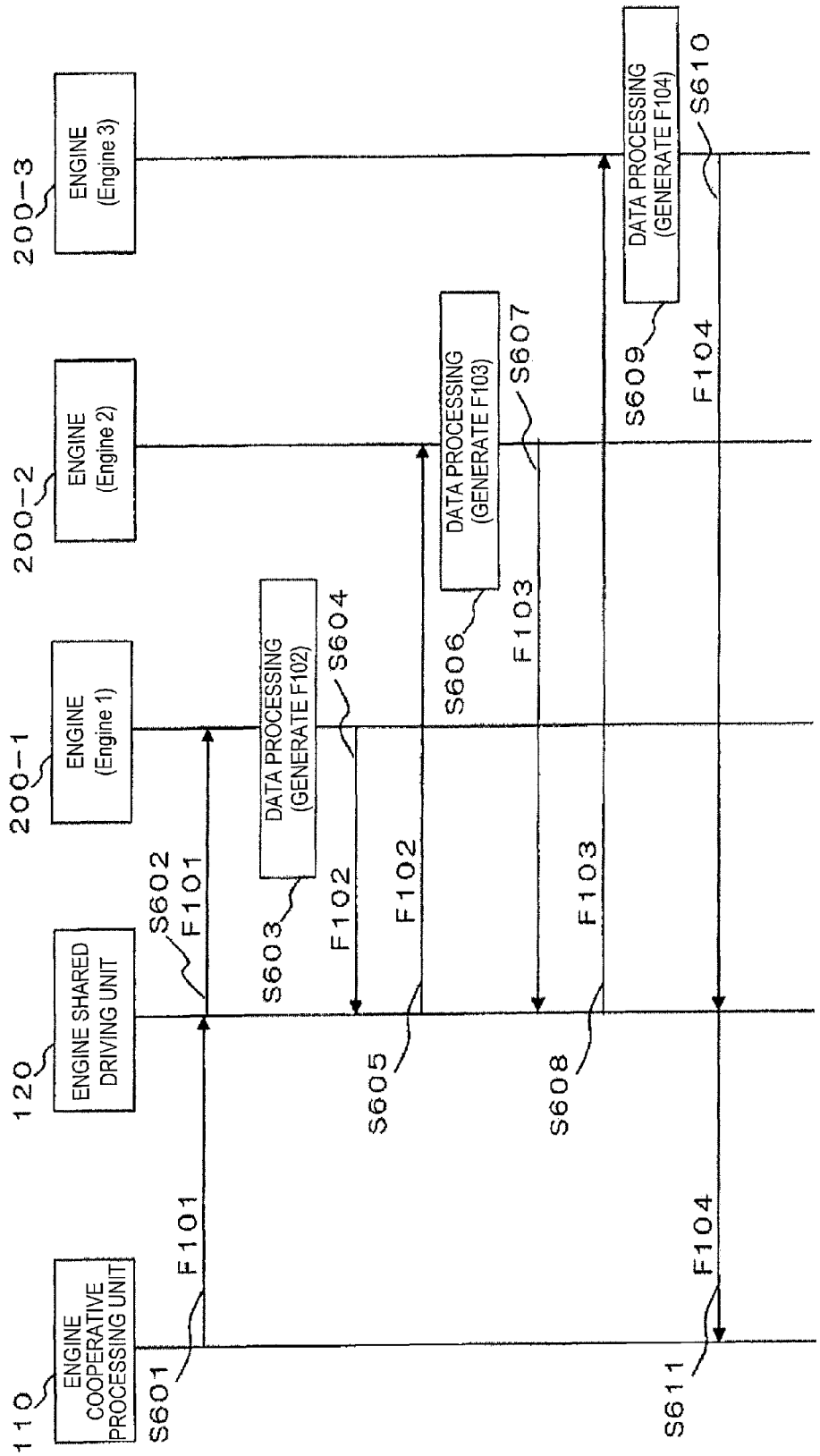
FIG. 10 is a sequence chart showing the operation when data processing is carried out for a first processing rule in the network analysis system according to the present embodiment.
Figure 12:
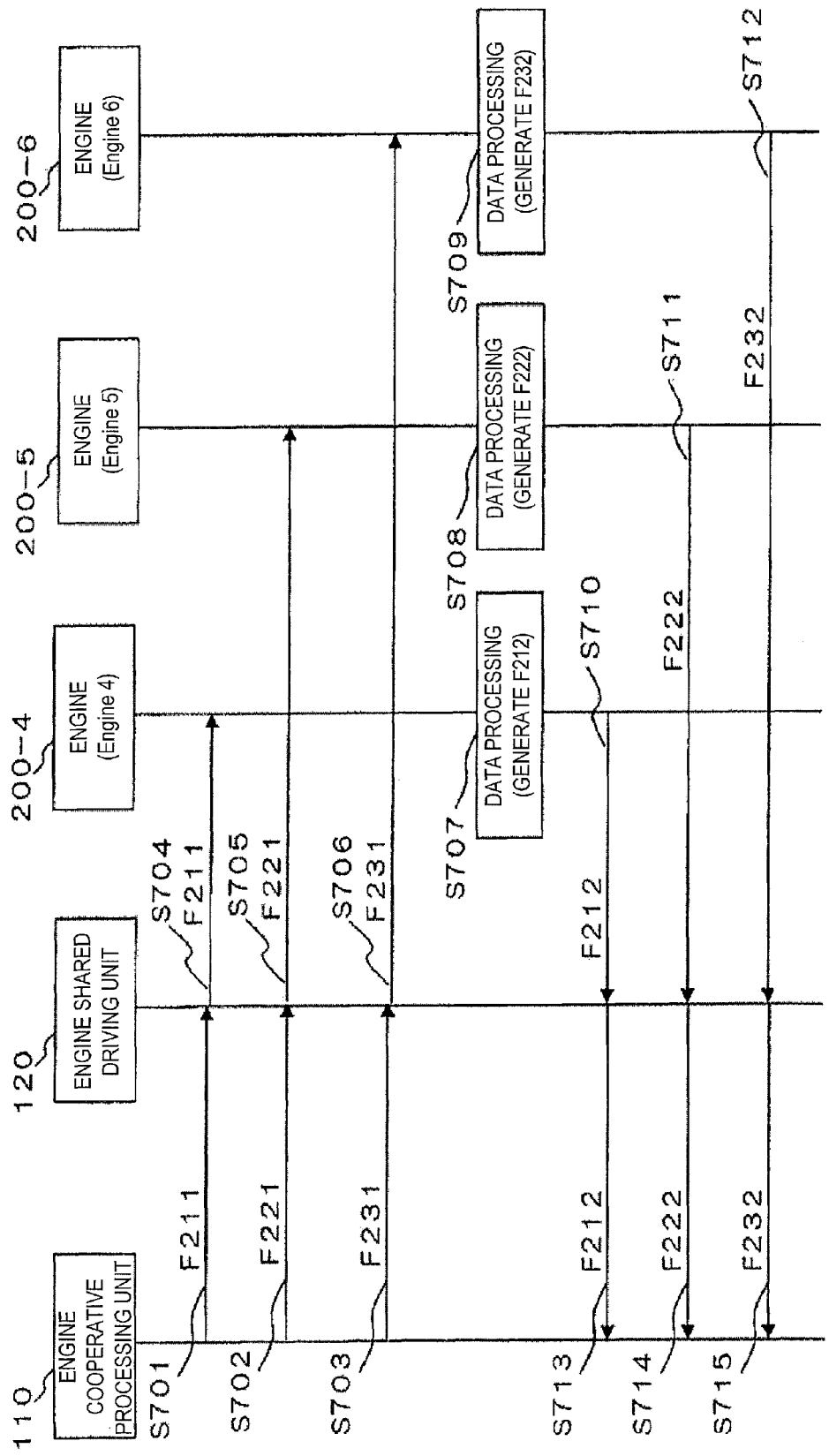
FIG. 12 is a sequence chart showing the operation when data processing is carried out for a second processing rule in the network analysis system according to the present embodiment.

First, the operation when the engine cooperative processing unit 110 causes the engines 200-1 to 200-3 to carry out data processing based on the data processing definition step of the processing rule R1 (see FIG. 2A described above) will be described with reference to FIGS. 10 and 11.

First, the engine cooperative processing unit 110 carries out syntax analysis on the processing rule R1 (see FIG. 2A described above) to generate a frame (hereinafter referred to as a "data processing frame") F101 of a specified format to have the engines 200-1 to 200-3 carry out data processing based on the analyzed syntax and supplies the data processing frame F101 to the engine shared driving unit 120 (S601).

As one example, the data processing frame F101 generated by the engine cooperative processing unit 110 in step S601 has a configuration such as that shown in FIG. 11A. As shown in FIGS. 11A-11D, the respective data processing frames are frames with fields for a processing designation header portion and a data portion. Note that although the description here assumes that a data processing frame carries out processing relating to one input data in one frame to simplify the description, it is also possible to carry out processing relating to one input data divided between a plurality of frames.

The data portion is a field in which input data that is to be processed in such data processing frame is inserted. The input data (input1) from the engine cooperative processing unit 110 is set in the data portion of the data processing frame F101.

The processing designation header portion is a field in which the processing order for when data processing for the data processing frame is to be carried out by the engines 200 and parameters (additional parameters) to be designated when data processing is carried out are described. As one example, as shown in FIG. 11A, the processing designation header portion is shown by a list in which pairs of engine IDs and additional parameters are arranged into the processing order.

In the data processing definition step (step S102) of the processing rule R1, as described above, a nested structure (syntax) where the engine 200-1 (Engine1) is caused to carry out processing first on the input data (input1), the result of such processing is further processed by the engine 200-2 (Engine2), and then the result of such processing is further processed by the engine 200-3 (Engine3) is described, so that serial processing is required. For this reason, to realize serial processing such as that described above using a simple description, the processing designation header portion is compatible with being described as a list in which pairs of an engine ID and additional parameters are arranged in accordance with the processing order.

As one example, as illustrated in FIG. 11A, "1(output_type1,parameter1), 2(output_type2,parameter2), 3(output_type3,parameter3);" is written in the processing designation header portion of the data processing frame F101. The "1(output_type1,parameter1)" description at the front of the list of the processing designation header portion of the data processing frame F101 shows that processing is carried out first for the data processing frame F101 at the engine 200-1 whose engine ID is "1". That is, the "1(output_type1,parameter1)" description has a content that corresponds to step S102-1 shown in FIG. 2A described above. Also, "2(output_type2, parameter2)" which corresponds to step S102-2 shown in FIG. 2A described above is described second in the list in the processing designation header portion of the data processing frame F101. In addition, "3(output_type3,parameter3)" which corresponds to step S102-3 shown in FIG. 2A described above is written third in the list in the processing designation header portion of the data processing frame F101. In addition, ";" is described at the final end of the processing designation header portion of the data processing frame F101 as a symbol showing the end of the list.

If a nested structure (syntax) such as that described above has been detected in the syntax analysis of the data processing definition step, as described above the engine cooperative processing unit 110 generates a list to be introduced into the processing designation header portion based on the content of the substeps that construct the data processing definition step.

Next, when the data processing frame F101 with the construction described above has been handed over, the engine shared driving unit 120 refers to "1(output_type1,parameter1)" that is the first element in the list in the processing designation header portion that constructs the data processing frame F101 and identifies that the transfer destination of the data processing frame F101 is the engine 200-1 (engine ID:1). The engine shared driving unit 120 then hands over the data processing frame F101 to the engine 200-1 (S602).

The engine 200-1 then extracts the input data (input1) of the data portion of the data processing frame F101 and the additional parameters (output_type1,parameter1) that are added to the first element in the list in the processing designation header portion. The engine 200-1 then carries out data processing using the additional parameters (output_type1, parameter1) on the extracted input data (input1) to obtain the data (Analyze1) after processing. Next, the engine 200-1 generates a data processing frame F102 (see FIG. 11B) where, for the data processing frame F101, the data portion is replaced with the data (Analyze1) after processing and the first element "1(output_type1,parameter1)" is also deleted from the list in the processing designation header portion (S603).

The engine 200-1 then hands over the data processing frame F102 to the engine shared driving unit 120 (S604).

Next, once the data processing frame F102 has been handed over, the engine shared driving unit 120 refers to "2(output_type2,parameter2)" that is the first element in the list in the processing designation header portion that constructs the data processing frame F102 and identifies that the transfer destination of the data processing frame F102 is the engine 200-2 (engine ID:2). The engine shared driving unit 120 then hands over the data processing frame F102 to the engine 200-2 (S605).

The engine 200-2 then extracts the input data (Analyze1) of the data portion of the data processing frame F102 and the additional parameters (output_type2,parameter2) that are added to the first element in the list in the processing designation header portion. The engine 200-2 then carries out data processing using the additional parameters (output_type2, parameter2) on the extracted input data (Analyze1) to obtain the data (Analyze2) after processing. Next, the engine 200-2 generates a data processing frame F103 (see FIG. 11C) where, for the data processing frame F102, the data portion is replaced with the data (Analyze2) after processing and the first element "2(output_type2,parameter2)" has been deleted from the list in the processing designation header portion (S606).

The engine 200-2 then hands over the data processing frame F103 to the engine shared driving unit 120 (S607).

Next, once the data processing frame F103 has been handed over, the engine shared driving unit 120 refers to "3(output_type3,parameter3)" that is the first element in the list of the processing designation header portion that constructs the data processing frame F103 and identifies that the transfer destination of the data processing frame F103 is the engine 200-3 (engine ID:3). The engine shared driving unit 120 then hands over the data processing frame F103 to the engine 200-3 (S608).

The engine 200-3 then extracts the input data (Analyze2) of the data portion of the data processing frame F103 and the additional parameters (output_type3,parameter3) that are added to the first element in the list of the processing designation header portion. The engine 200-3 then carries out data processing using the additional parameters (output_type3, parameter3) on the extracted input data (Analyze2) to obtain the data (Analyze3) after processing. Next, the engine 200-3 generates a data processing frame F104 (see FIG. 11D) where, for the data processing frame F103, the data portion is replaced with the data (Analyze3) after processing and the first element "3(output_type3,parameter3)" has been deleted from the list in the processing designation header portion (S609).

The engine 200-3 then hands over the data processing frame F104 to the engine shared driving unit 120 (S610).

Next, when the data processing frame F104 has been handed over, the engine shared driving unit 120 refers to the processing designation header portion that constructs the data processing frame F104. At this time, since the list in the processing designation header portion that constructs the data processing frame F104 is empty (a state where only ";" that is the symbol showing the end of the list is described), the engine shared driving unit 120 transmits the data processing frame F104 not to an engine 200 but to the engine cooperative processing unit 110 (S611).

As described above, it is assumed that if the list in the processing designation header portion that constructs a data processing frame is empty, the engine shared driving unit 120 transmits such data processing frame to the engine cooperative processing unit 110. In this way, by distributing the data processing frame using the list in the processing designation header portion, it is possible to carry out processing efficiently without the processing returning to the engine cooperative processing unit 110 merely for interrupt processing every time processing by the respective engines 200 ends. Also, since it is sufficient as the processing of the engine shared driving unit 120 to carry out simple processing (switching processing) that determines the transmission destination by referring to the list in the processing designation header portion, it becomes easier to realize high-speed processing (for example, it becomes easier to increase the proportion of hardware used to construct the apparatus).

As described above, in the engine cooperative processing unit 110, by merely generating the data processing frame F101 in accordance with the data processing definition step of the processing rule R1 and handing the data processing frame F101 over to the engine shared driving unit 120, it is possible to acquire the result (Analyze3) produced via the processing of the engines 200-1 to 200-3.

Next, the operation when the engine cooperative processing unit 110 causes the engines 200-4 to 200-6 to carry out data processing based on the data processing definition step of the processing rule R2 (see FIG. 2B described above) will be described with reference to FIGS. 12 and 13A-13F.

First, the engine cooperative processing unit 110 carries out syntax analysis on the processing rule R2 (see FIG. 2B described above) to generate data processing frames F211, F221, F231 (see FIG. 13A, FIG. 13B, and FIG. 13C) based on the analyzed syntax for the engines 200-4 to 200-6 and hands the data processing frames F221, F221, F231 to the engine shared driving unit 120 (S701 to S703).

In the data processing definition step (step S202) of the processing rule R2, unlike the processing rule R1, since there is no nested structure for having the plurality of engines 200 serially carry out data processing, the data processing frames F211, F221, and F231 that separately request the engines 200-4 to 200-6 to carry out data processing are generated.

When the data processing frames F211, F221, and F231 have been handed over, the engine shared driving unit 120 hands over the respective data processing frames to the transmission destination engines 200-4 to 200-6 (S704 to S706).

The engine 200-4 to which the data processing frame F211 has been handed over processes the input data (input1) in the data portion of the data processing frame F211 to obtain the data (Analyze1) after processing. For the data processing frame F211, the engine 200-4 then replaces the data portion with the data (Analyze1) after processing, generates a data processing frame F212 (see FIG. 13D) from which the first element in the list in the processing designation header portion has been deleted (S707), and hands over the data processing frame F212 to the engine shared driving unit 120 (S710).

The engine 200-5 to which the data processing frame F221 has been handed over processes the input data (input1) in the data portion of the data processing frame F221 to obtain the data (Analyze2) after processing. For the data processing frame F221, the engine 200-5 then replaces the data portion with the data (Analyze2) after processing, generates a data processing frame F222 (see FIG. 13E) from which the first element in the list of the processing designation header portion has been deleted (S708), and hands over the data processing frame F222 to the engine shared driving unit 120 (S711).

The engine 200-6 to which the data processing frame F231 has been handed over processes the input data (input1) in the data portion of the data processing frame F231 to obtain the data (Analyze3) after processing. For the data processing frame F231, the engine 200-6 then replaces the data portion with the data (Analyze3) after processing, generates a data processing frame F232 (see FIG. 13F) from which the first element in the list of the processing designation header portion has been deleted (S709), and hands over the data processing frame F231 to the engine shared driving unit 120 (S712).

When the data processing frames F212, F222, F232 (in all of which the content of the processing designation header portion is empty) have been handed over, the engine shared driving unit 120 hands over each of the data processing frames F212, F222, F232 to the engine cooperative processing unit 110 (S713 to S715).

As described above, at the engine cooperative processing unit 110, in accordance with the data processing definition step of the processing rule R2, by merely generating the data processing frames F211, F221, and F231 and handing over the data processing frames F211, F221, and F231 to the engine shared driving unit 120, it is possible to acquire the results (Analyze1, Analyze2, Analyze3) produced via the processing of the engines 200-4 to 200-6.

(A-3) Effects of the Present Embodiment

The effects described below can be achieved by the present embodiment.

In the network analysis system 10, the engines 200 are provided on the network analysis apparatus 100 and a data processing protocol (i.e., exchanges using data processing frames) between the network analysis apparatus 100 and the engine 200 is clearly established. By doing so, it becomes easy to replace and/or change the specification (upgrade) of the engines 200 in single engine units on the network analysis apparatus 100.

Also, in the network analysis apparatus 100, the processing rule management table 111 and the engine management table 112 are provided and the engines 200 to be used for each processing rule are managed. By doing so, even if an engine 200 is uninstalled, it is possible to maintain normal operation for the entire system.

In addition, since communication with the engine cooperative processing unit 110 and between the engines 200 can be carried out by just simple exchanges that use data processing frames, it is possible to realize higher-speed data processing.

In addition, in the network analysis system 10, since it is possible to share the engines 200 between a plurality of processing rules, it becomes easy to construct the system efficiently.

(B) Other Embodiments

The present invention is not limited to the embodiment described above and can be subjected to modifications such as the examples described below.

(B-1) Although the log accumulation unit 150 simply accumulates log data in the embodiment described above, it is also possible to configure a database that is accessible from the OPS 300 or the like. As one example, it is possible to provide an interface which, when notification of the occurrence of a network abnormality has been given from the network analysis apparatus 100 to the OPS 300, enables the user to use the OPS 300 to access the database (the log accumulation unit 150) and confirm the details of the network abnormality that has occurred. More specifically, as one example it is possible to separately provide an engine 200 that is capable of carrying out a search on the content of the database (the log accumulation unit 150).

(B-2) Although the network analysis apparatus 100 analyzes the traffic flowing through the router in the present embodiment, the analysis is not limited to a router and the traffic flowing in another network apparatus (for example, various types of server or a firewall) may be acquired and analyzed.

(B-3) Although data management where all of the engines 200 are different has been described in the above embodiment, it is possible to use a configuration where a plurality of engines 200 that carry out the same data processing are provided and load distribution is carried out. In this case, in the engine cooperative processing unit 110, when generating the data processing frames, it is necessary to carry out processing that allocates processing with the same content to a plurality of engines 200 (for example, allocation according to a round robin method).

(B-4) Although the transmission and reception of data between the engine cooperative processing unit 110 and the respective engines 200 is carried out using data processing frames in the embodiment described above, so long as it is possible to carry out the transmission and reception of data, there are no limitations on the construction of the data.

(B-5) Although it is possible to confirm whether there is no processing rule that uses a specified engine 200 when there has been an uninstallation request for such engine 200 according to the embodiment described above, it is also possible to use a configuration that judges, when a new processing rule has been registered, whether such processing rule is executable by only the engines 200 that are already provided and defines, if the new processing rule is not executable, attributes and the like of the processing to be carried out and installs a suitable engine 200 from the OPS 300 or the like.

(B-6) Although one network analysis system 10 is connected to the OPS 300 in the embodiment described above, it is also possible to carry out control by connecting a plurality of network analysis systems 10 to the OPS 300. With this configuration, it would be conceivable for the OPS 300 to identify the types of engines 200 provided in each network analysis system 10 based on the engine ID or the like, decide the load of each network analysis system 10 based on the processing rules that are executable for the respective network analysis systems 10 and have cooperative processing carried out.

(B-7) Although the embodiment described above has a configuration where the report data transmitted from the export processing unit 440 of the router 400 is inputted via the internal network N1 into the network analysis system 10 as report packets, it is also possible to use a configuration where the export processing unit 440 and the network analysis system 10 are directly connected without the internal network N1 in between.

(B-8) Although the embodiment described above is configured to acquire report data from the export processing unit 440 provided in the router 400, it is also possible to use a configuration where a separate flow exporter (a network apparatus equipped with only the function of the export processing unit 440) is additionally provided in the network to acquire the report data.

(B-9) Although management of the information relating to the data processing definition information and the management of the data processing modules are carried out using the processing rule management table 111 and the engine management table 112 in table format in the embodiment described above, it is unnecessary for a configuration capable of executing the same function to be in table format and may be in another format such as database format.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

The invention claimed is:

1. A network analysis apparatus, for use with a plurality of engines that perform data processing, to carry out an analysis process relating to an IP network, comprising:
   a first unit holding data-to-be-analyzed relating to the IP network;
   a second unit storing data processing definition information that defines steps that carry out the processing of the data-to-be-analyzed using at least one of the engines; and
   an engine driving unit causing the at least one of the engines to carry out data processing based on the data processing definition information to obtain a data processing result,
   wherein the network analysis apparatus generates data processing frames having predetermined formats for causing respective ones of the engines to execute data processing and to determine which of the engines is to be used for the data processing,
   wherein each of the plurality of engines comprises an interface unit that communicates with the network analysis apparatus and a data processing unit carrying out data processing in accordance with a request from the network analysis apparatus, and
   wherein the network analysis apparatus is configured to generate the data processing frames to include a processing designation header identifying one engine, from among the plurality of engines, to execute the data processing of first data, and identifying a second engine, from among the plurality of engines, to execute the data processing of second data based on the data processing of the first data.

2. The network analysis apparatus of claim 1, wherein the network analysis apparatus is configured to generate the data processing frames to include a processing designation header identifying one engine, from among the plurality of engines, to execute the data processing.

3. A non-transitory computer-readable medium that stores a network analysis program causing a computer, which is installed in a network analysis apparatus that accommodates a plurality of engines that perform data processing and that carries out an analysis process relating to an IP network using the engines, to function as:
   a first unit holding data-to-be-analyzed relating to the IP network;
   a second unit storing data processing definition information that defines steps that carry out the processing of the data-to-be-analyzed using the at least one of the plurality of engines; and
   an engine driving unit causing the at least one of the engines to carry out data processing based on the data processing definition information to obtain a data processing result,
   wherein the network analysis program additionally causes the computer to generate data processing frames having a predetermined formats for causing respective ones of the engines to execute data processing and to determine which of the engines is to be used for the data processing,
   wherein each of the plurality of engines comprises an interface unit that communicates with the network analysis apparatus and a data processing unit carrying out data processing in accordance with a request from the network analysis apparatus, and
   wherein the network analysis apparatus is configured to generate the data processing frames to include a processing designation header identifying one engine, from among the plurality of engines, to execute the data processing of first data, and identifying a second engine, from among the plurality of engines, to execute the data processing of second data based on the data processing of the first data.

4. A network analysis system that carries out analysis related to an IP network, comprising:
   a plurality of engines that perform data processing; and
   a network analysis apparatus that carries out an analysis process relating to the network using the engines,
   wherein the IP network analysis apparatus includes:
      a first unit holding data-to-be-analyzed relating to the IP network, a second unit storing data processing definition information that defines steps for carrying out the processing of the data-to-be-analyzed, and an engine driving unit that communicates with the engines and the first unit and that stores data processing definition information which defines steps for carrying out the processing of the data-to-be-analyzed, the engine driving unit additionally causing at least one of the engines to carry out data processing based on the data processing definition information to obtain a data processing result, wherein each data processing engine includes:
an interface unit connected to the network analysis apparatus, and
a data processing unit that carries out data processing in accordance with a request from the network analysis apparatus, and wherein the network analysis apparatus generates data processing frames having predetermined formats for causing respective ones of the engines to execute data processing, the engine driving unit determining which of the engines is to be used for the data processing, wherein the network analysis apparatus is configured to generate the data processing frames to include a processing designation header identifying one engine, from among the plurality of engines, to execute the data processing of first data, and identifying a second engine, from among the plurality of engines, to execute the data processing of second data based on the data processing of the first data.

5. The network analysis system according to claim 4, wherein each of the engines, when carrying out its predetermined data processing, receives one of the data processing frames, replaces data of that data processing frame with data obtained by the predetermined data processing performed by the respective engine, and deletes an element of that data processing frame according to a processing order in that data processing frame.

* * * * *